United States Patent
Sethi et al.

(10) Patent No.: US 10,990,420 B1
(45) Date of Patent: Apr. 27, 2021

(54) CUSTOMIZING USER INTERFACE COMPONENTS

(71) Applicant: Dell Products L.P., Round Rock, TX (US)

(72) Inventors: Parminder Singh Sethi, Ludhiana (IN); Lakshmi Soroja Nalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/662,685

(22) Filed: Oct. 24, 2019

(51) Int. Cl.
*G06F 3/048* (2013.01)
*G06F 9/451* (2018.01)

(52) U.S. Cl.
CPC .................................. *G06F 9/451* (2018.02)

(58) Field of Classification Search
None
See application file for complete search history.

(56) References Cited

U.S. PATENT DOCUMENTS

| 2003/0103066 | A1* | 6/2003 | Sigi | G06F 3/0482 715/700 |
| 2008/0282154 | A1* | 11/2008 | Nurmi | G06F 3/0237 715/261 |
| 2010/0115448 | A1* | 5/2010 | Lysytskyy | G06F 3/0237 715/773 |
| 2011/0254865 | A1* | 10/2011 | Yee | G06F 3/04886 345/661 |
| 2013/0044063 | A1 | 2/2013 | Kim | |
| 2014/0022216 | A1* | 1/2014 | Nakamura | G06F 3/0488 345/174 |
| 2017/0052702 | A1* | 2/2017 | Norris, III | G06F 3/04886 |

\* cited by examiner

*Primary Examiner* — William C Trapanese
(74) *Attorney, Agent, or Firm* — Ryan, Mason & Lewis, LLP

(57) ABSTRACT

A user interface is presented to a user. The method determines whether or not to customize a size of one or more components on the user interface. The method then determines one or more candidate components on the user interface to customize, when a determination is made to customize a size of one or more components on the user interface. The method customizes the one or more candidate components on the user interface, and presents a customized user interface to the user.

20 Claims, 8 Drawing Sheets

400

CUSTOMIZING USER INTERFACE COMPONENTS

FIELD

The field relates generally to information processing systems, and more particularly to techniques for automatically customizing one or more components in a user interface presented to a user in such information processing systems.

BACKGROUND

Many computing devices utilize user interfaces that are virtual in nature. For example, a virtual user interface is one that is presented on a two-dimensional display, associated with the computing device, with touchscreen technology such that the user can input data and selections to the computing device by touching the touchscreen in the area in which a given component of the user interface is displayed (e.g., tapping a displayed key on a virtual keypad). With regard to such user interfaces and their components, accessibility and touch points are very important factors. Points or targets that are smaller in size are difficult for a user to tap/touch accurately. Because of a fixed width of points or targets, tapping a button requires significant effort and thus can be a difficult task. This in turn leads to a negative experience since the user gets frustrated or is dissatisfied. The maximum size of keys on a virtual keypad is relatively small. The size of the keys is currently based on an average fingertip size which does not accommodate for all fingertip sizes in terms of comfort and ease of accessibility.

SUMMARY

Embodiments of the invention provide techniques for automatically customizing one or more components in a user interface presented to users in an information processing system.

For example, in one embodiment, a method comprises the following steps. A user interface is presented to a user. The method determines whether or not to customize a size of one or more components on the user interface. The method then determines one or more candidate components on the user interface to customize, when a determination is made to customize a size of one or more components on the user interface. The method customizes the one or more candidate components on the user interface, and presents a customized user interface to the user.

In some embodiments, determining whether or not to customize a size of one or more components on the user interface further comprises determining a derived radius for a contact area associated with the user touching one or more components of the user interface.

In some embodiments, determining whether or not to customize a size of one or more components on the user interface further comprises determining an average radius for a contact area associated with one or more components of the user interface.

In some embodiments, a determination to customize a size of one or more components on the user interface is made when the derived radius is greater than the average radius.

In some embodiments, determining one or more candidate components on the user interface to customize further comprises determining a first set of one or more components of the user interface that are frequently used.

In some embodiments, determining one or more candidate components on the user interface to customize further comprises determining a second set of one or more components of the user interface that represent one or more component combinations which are part of a recommendation made for a subsequent selection by the user.

In some embodiments, the one or more candidate components to be customized comprise the components that represent an intersection of the first set and the second set.

In some embodiments, customization of one or more components of the user interface comprises enlarging the size of one or more components.

In some embodiments, customization of one or more components of the user interface comprises reducing the size of one or more components.

In some embodiments, the user interface comprises a virtual keypad and the one or more components of the virtual keypad comprise one or more keys.

In some embodiments, the method further comprises tracking which one of redundant components on the user interface are being used by the user (e.g., right-side shift key or left-side shift key on a virtual keypad), and then identifying at least one of the redundant components as a candidate component to be resized.

Advantageously, illustrative embodiments provide a methodology for displaying characters on a virtual keypad effectively, according to user context. Thus, keys of virtual keypads are resized based on customized policies for users. While illustrative embodiments refer to virtual keypads as graphical user interfaces to be customized, alternative embodiments contemplate extension to any user interface features or elements.

These and other features and advantages of the invention will become more readily apparent from the accompanying drawings and the following detailed description.

DETAILED DESCRIPTION

Figure 1:
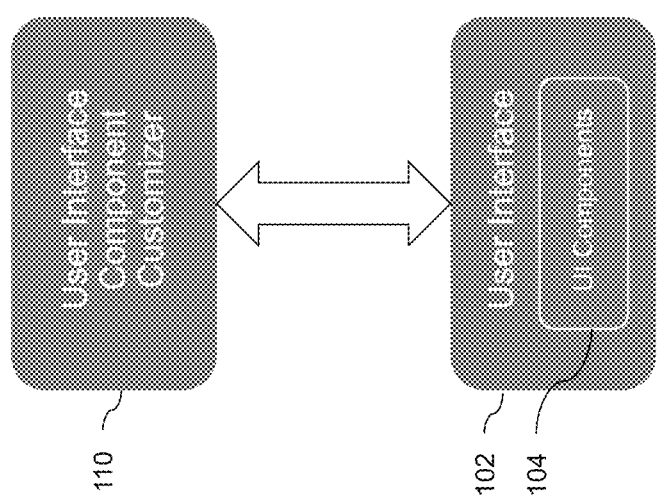
FIG. 1 depicts an information processing system with a user interface component customizer, according to an illustrative embodiment.

Illustrative embodiments may be described herein with reference to exemplary information processing systems such as, but not limited to, computing environments, cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "information processing system," "cloud environment," "cloud computing platform," "cloud infrastructure," "data repository," "data center," "data processing system," "computing system," "data storage system," "computing environment," and the like as used herein are intended to be broadly construed, so as to encompass, for example, any arrangement of one or more processing devices.

As mentioned in the background section above, accurately tapping or touching a key on a virtual keypad can be difficult due to the relatively small size of the key in comparison to the user's fingertip. For example, the user may have to touch the key several times before the computing device recognizes the key intended by the user. In addition, a key in the vicinity of the intended key may be wrongly recognized by the computing device if the user's fingertip inadvertently touches a portion of the unintended key.

Illustrative embodiments overcome the above and other drawbacks associated with user interfaces, such as virtual keypads, by providing methodologies that customize components of the user interface to make touch-selection of a component easier for the user. For example, different components can be upsized by predicting the next component that may be used by the user. Further, certain other components can be downsized to accommodate the upsized components within the same overall area of the user interface. Thus, illustrative embodiments identify the need for resizing user interface components and then resize the components with the proper proportion as per the user's needs. For example, customization may comprise upsizing the components which the user will most likely tap next. In illustrative embodiments, resizing is rendered on the fixed center of the key, hence relative location before and after resizing remains the same.

Advantageously, the customized user interface can make use of the interface more user-friendly for individuals who would benefit from resized characters, e.g., users who use the "hunt and peck" method of typing (i.e., user looks at their keyboard for location, then presses the key, generally using only their index fingers), users who do not readily remember the placement of the keys on keyboard (i.e., they have to look at the keyboard for the next key), etc.

It is to be appreciated that the term "virtual keypad" as used herein is intended to refer to any user interface that displays virtual keys for user selection, e.g., virtual keyboards. Furthermore, embodiments are not limited to customization of keys of virtual keyboards, but rather they are applicable to any user interface that has selectable onscreen components such as, but not limited to, notification banners which have SMTP settings and remind me later features.

FIG. 1 depicts an information processing system with a user interface component customizer, according to an illustrative embodiment. More particularly, as shown, information processing system 100 comprises a user interface 102 which has user interface (UI) components 104. As will be further depicted in illustrative embodiments, the user interface 102 and components 104 can be a virtual keypad (keyboard) and its corresponding virtual keys. However, as mentioned herein, embodiments are not limited to virtual keypads.

The information processing system 100 also comprises a user interface component customizer 110. Customizer 110, as will be further explained in detail, determines whether or not to customize a size of one or more components 104 on the user interface 102. When the customizer 110 determines that a size of one or more components 104 of the user interface 102 is to be customized, the customizer 110 determines one or more candidate components of the components 104 on the user interface 102 to customize. The customizer 110 then customizes the one or more candidate components on the user interface 102. The customized instance of the user interface 102 is then presented to the user.

Figure 8:
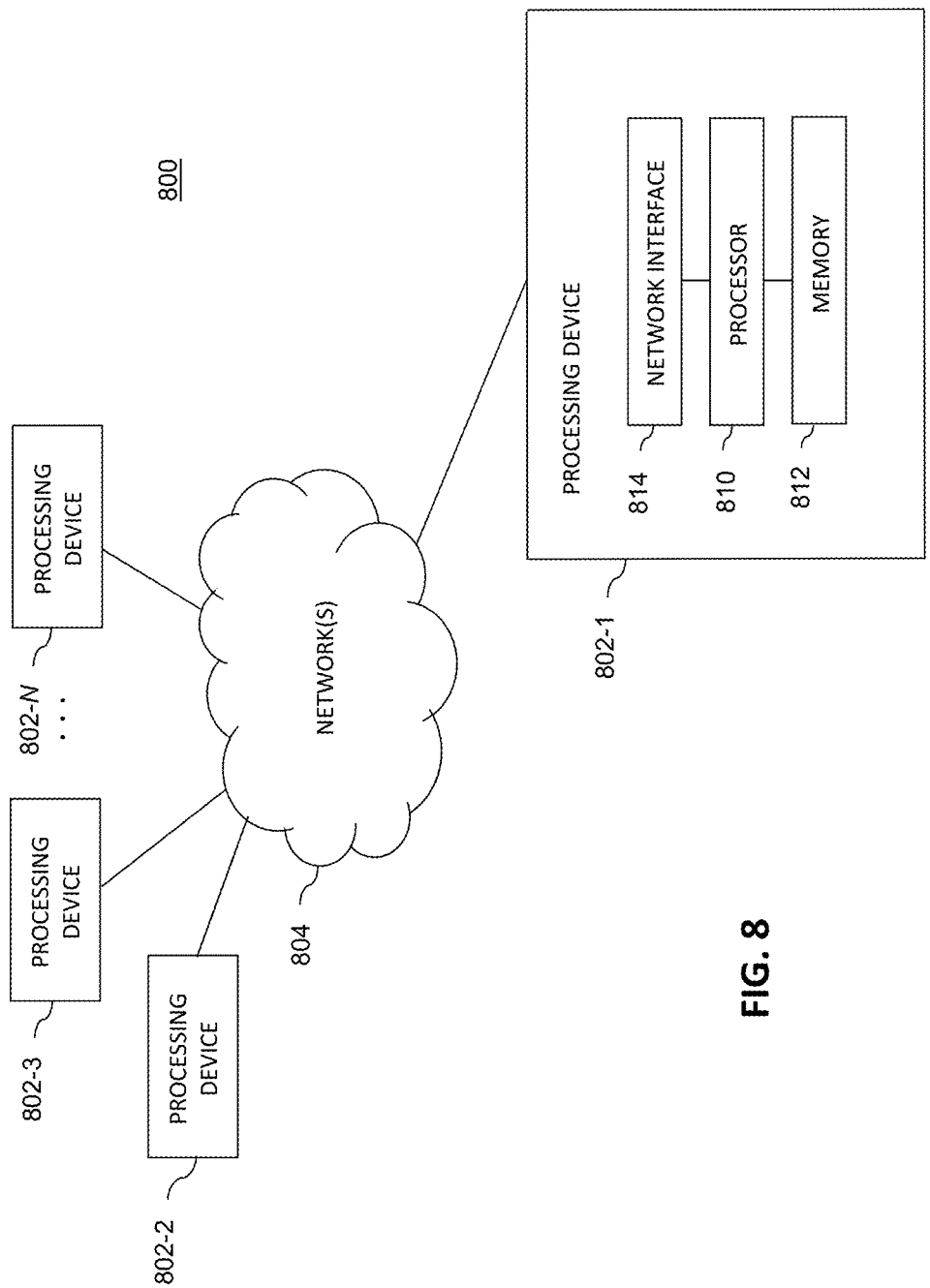
FIG. 8 depicts a processing platform used to implement a user interface component customizer, according to an illustrative embodiment.

Note that while not expressly shown in FIG. 1, information processing system 100 also comprises, in illustrative embodiments, one or more processing devices and one or more memories (as well as other computing elements) that operate with the user interface 102 and the customizer 110 to perform the various functionalities described herein. As will be evident, FIG. 8 shows further details of an illustrative embodiment of a processing platform upon which information processing system 100 can be implemented.

In the case when user interface 102 is a virtual keypad and the components 104 are keys with characters (e.g., numbers, letters, symbols, etc.) thereon, methodologies described herein provide ways to display the keys on the keypad effectively, according to the user's context. Keys on virtual keypads are resized based on one or more customized policies for a given user.

As explained above, customizer 110 makes two main determinations. First, the customizer 110 determines whether or not to customize a size of one or more components 104 on the user interface 102. Details of an illustrative embodiment for this first determination are described below in the context of FIGS. 2 and 3. When the customizer 110 determines that a size of one or more components 104 of the user interface 102 is to be customized, in a second determination, the customizer 110 determines one or more candidate components of the components 104 on the user interface 102 to customize. Details of an illustrative embodiment for this second determination are described below in the context of FIGS. 4 and 5.

Figure 2:
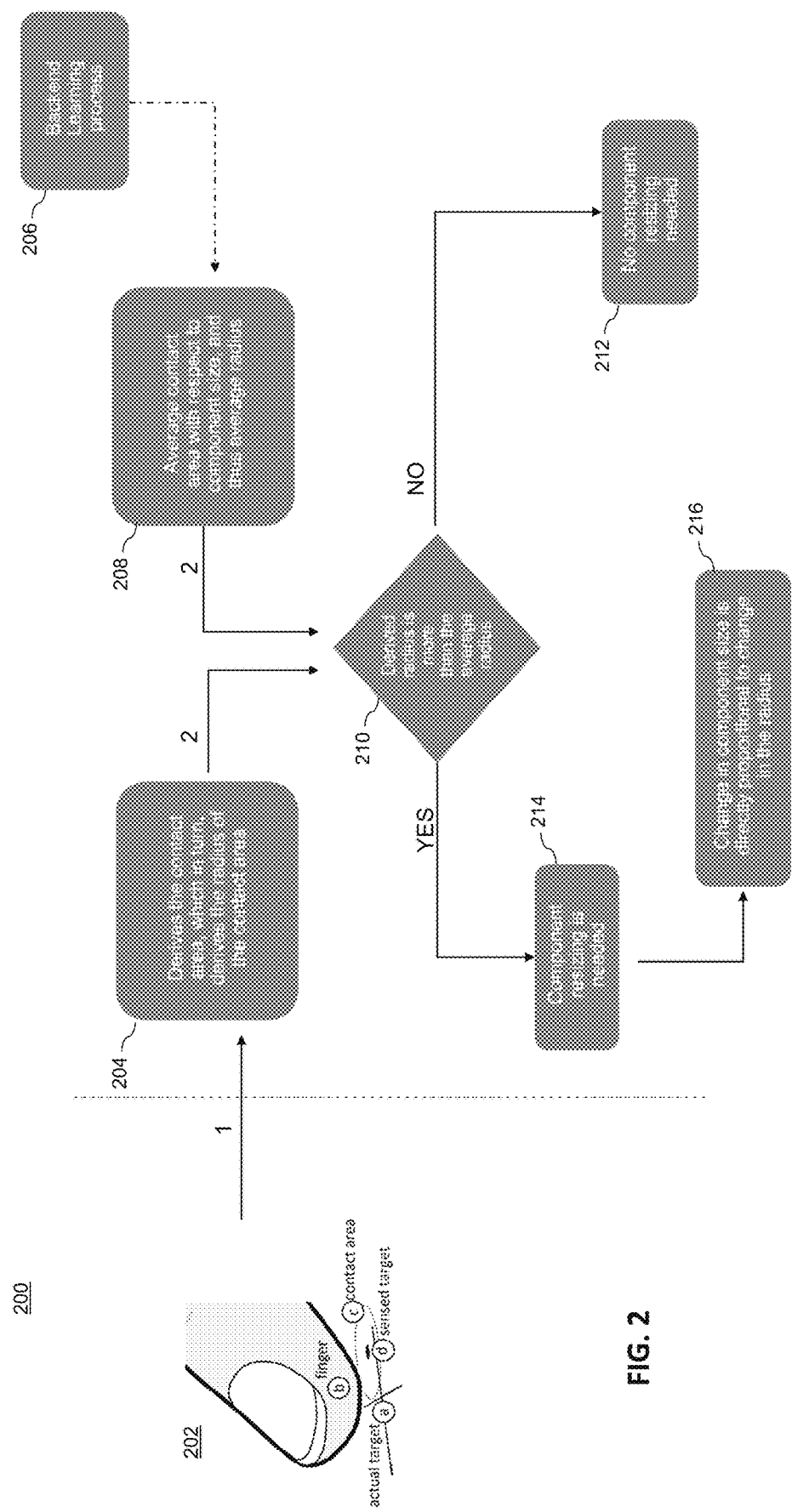
FIG. 2 depicts a methodology for determining whether or not to customize one or more components of a user interface, according to an illustrative embodiment.

Turning now to FIG. 2, a methodology 200 for determining whether or not to customize one or more components of a user interface is shown. In current touchscreen technologies on user interfaces, the contact area or contact patch is typically defined as the circle that is generated by the contact area between finger and device (i.e., the device here refers to the touchscreen used). A centroid is the geometric center of contact patch which is the sensed target. Contact area can differ among people but they can also be similar. For example, despite the relatively smaller finger size of children, sometimes they form the same size contact area as adults because they apply more pressure on the device. However, the contact area can differ from person to person (and even touch to touch for one person).

As mentioned above and as illustrated in graphic 202, current touchscreen technologies sense touch by observing the contact area between the finger and the device. Thus, on current touchscreens for an actual target (a), the finger (b) creates a contact area (c), which is observed by the touchscreen and reduced to it's two-dimensional (2D) centroid (d).

In step 204, methodology 200 derives the contact area (c) on the user interface for the user's finger, which in turn, enables derivation of the radius of the contact area (derived radius). In step 206, a backend learning process 206 determines, in step 208, an average contact area with respect to component (e.g., key) size on the user interface, which in turn, enables derivation of the radius of the average contact area (average radius), as will be further explained below in the context of FIG. 3.

In step 210, the derived radius (from step 204) is compared to the average radius (step 208) to determine if the derived radius is more than the average radius. When the derived radius is not more than the average radius, no component resizing is needed (212). However, when the derived radius is more than the average radius, then component resizing is needed (214). It is determined, in step 216, that the change in the component size is directly proportional to the change in the radius. That is, the component size change depends on how much bigger the derived radius is relative to the average radius. For example, if the derived radius is 1.5 times larger than the average radius, then the component is resized to be 1.5 times larger than its original size. In illustrative embodiments, resizing is rendered on the fixed center of the component, hence relative location before and after resizing remains the same. Further, in alternative embodiments, the resizing does not have to be directly proportional to the contact area radius but rather can be calculated based on some other function or proportion.

Figure 3:
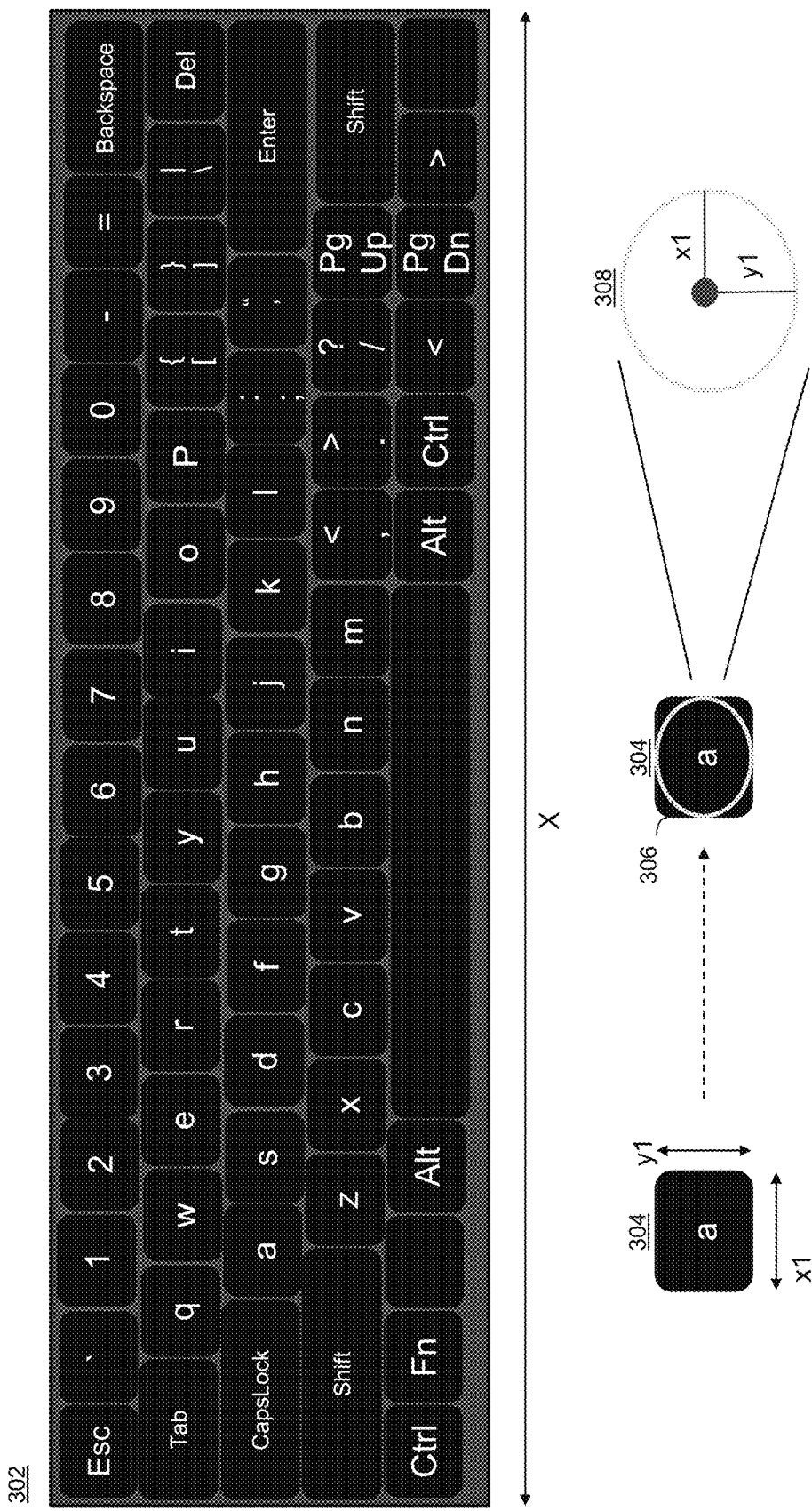
FIG. 3 depicts a backend learning process for a methodology for determining whether or not to customize one or more components of a user interface, according to an illustrative embodiment.

FIG. 3 depicts a backend learning process 300 for determining an average contact area, and thus an average radius (steps 206/208 in FIG. 2), of components of a user interface. More particularly, assume the user interface is a virtual keyboard 302 with a plurality of keys including all keys found on a typical QWERTY keyboard. The virtual keyboard 302 is an image of the keyboard and associated keys with touchscreen technology capabilities. The current touchscreen technology is configured to allow a user to touch the area corresponding to a given key, which then is recognized by the computing device coupled to the user interface. So, for example, when the user taps the virtual key marked with the character "a", the device should recognize that the user intended to type the letter "a". This is how text and other data are entered into the computing device through the virtual keyboard 302 by the user.

Assume that, for the virtual key marked with the character "a" (key 304) having dimensions x1 and y1, the maximum contact area 306 that key 304 can take is computed as 3.14*x1*y1. (as per the geometric relationship including pi and radius depicted in 308). This contact area 306 can represent the (default) average contact area from which the average radius in step 208 of FIG. 2 is derived.

Figure 4:
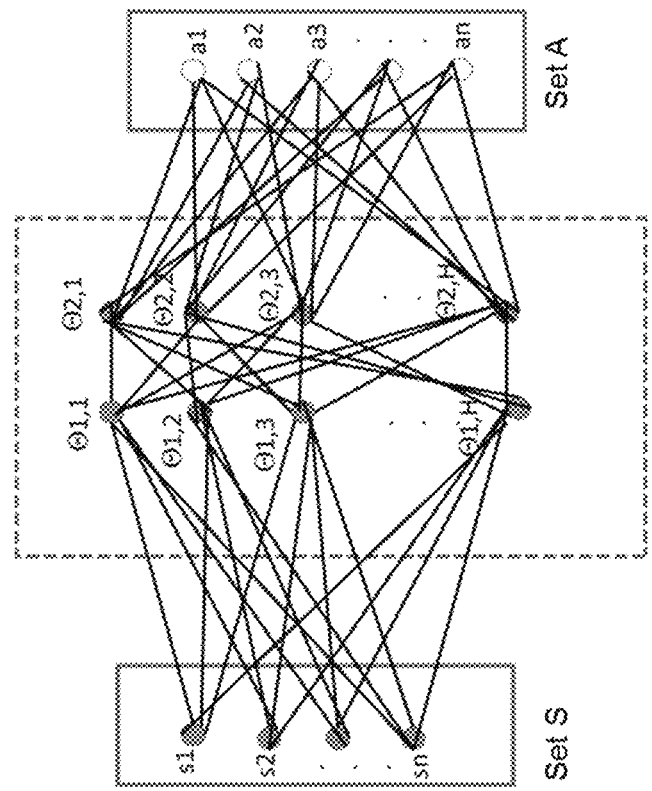
FIG. 4 depicts a methodology for determining which user interface components to customize, according to an illustrative embodiment.

Turning now to FIG. 4, a methodology 400 is shown for determining which components on the user interface to customize, once it is determined that one or more components should be customized as per methodology 200 in FIG. 2.

As shown, methodology 400 comprises determining a first set (set S) of one or more components (s1, s2, ... sn) of the user interface that are frequently used. Thus, in one example, set S is the most frequently used keys for a given application program (application) with which the user interface is used. The number of keys in set S can be different for different applications.

Methodology 400 further comprises determining a second set (set A) of one or more components (a1, a2, ... an) of the user interface that represent one or more component combinations which are part of a recommendation made for a subsequent selection by the user. Note that the number of keys in set A can be different than the number of keys in set S, or they can be the same.

In illustrative embodiments, set A contains the characters which are part of a recommendation made for the next words while typing. For example, it is assumed that the computing device, with which the user interface is implemented, is configured to provide predictive autocompletion for upcoming letters of a word and/or upcoming words of a sentence or phrase. The predictive recommendations are determined based on historical data collected for the given application and/or user. Any conventional predictive autocompletion algorithm can be employed. Thus, for example, assuming the user types the word "How" on the virtual keyboard, the algorithm could predict the next words being "are", "to" or "do". Each time another word is typed, the algorithm would predict the next words until the entire sentence or phrase is entered by the user. So assuming the words "are", "to" and "do" are the predicted next words, set A includes characters "e", "r", "t", "a", "d" and "o".

Methodology 400 then determines the one or more candidate components to be customized (resized) comprise the components that represent an intersection of the first set and the second set, i.e., set S n set A, where n stands for intersection. Assume that set S contains "e", "r", "t", "a" and "o" as frequently used keys, but not 'd', for the given application (the set may contain more than these keys). Since set A contains "e", "r", "t", "a", "d" and "o", the intersection would be "e", "r", "t", "a" and "o" (excluding "d"). Thus, methodology 400 determines that keys "e", "r", "t", "a" and "o" on the virtual keyboard are to be enlarged. In one or ore illustrative embodiments, enlargement is directly proportional to the contact area radius (recall step 216 in methodology 200 of FIG. 2) and rendered on the fixed center of the key so as to maintain relative location before and after resizing.

While methodology 400 determines keys in the virtual keyboard that are to be enlarged, it is realized that some existing keys on the virtual keyboard should be reduced in size in order to accommodate the enlarged keys within the same overall area (footprint) of the virtual keyboard.

Figure 5:
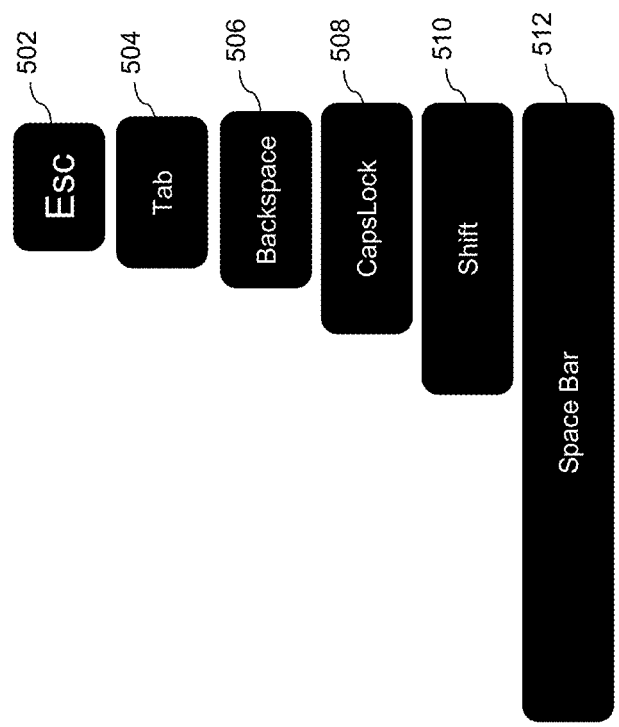
FIG. 5 depicts an example of candidate keys for reduction, according to an illustrative embodiment.

FIG. 5 depicts an example of candidate keys for reduction, according to an illustrative embodiment. Keys 502 (Esc), 504 (Tab), 506 (Backspace), 508 (CapsLock), 510 (Shift) and 512 (Space Bar, although typically not marked at all) are keys on a virtual keyboard with different sizes (larger than the standard letter keys and number keys) and which are available on any standard virtual keyboard can serve as candidates to give their space to keys that are being enlarged. Giving space can mean reducing the size of the candidate key or allowing an enlarged key to partially eclipse it. The default area for the eclipse can be generated inside each of the keys 502 through 512. Each of these keys 502 through 512 are present in at least one of the rows in the virtual keyboard and each of these keys widths are more than is required for the user to accurately tap. In some embodiments, the width of these keys can be reduced with respect to the percentage of increase needed for the enlarged keys.

Figure 6:
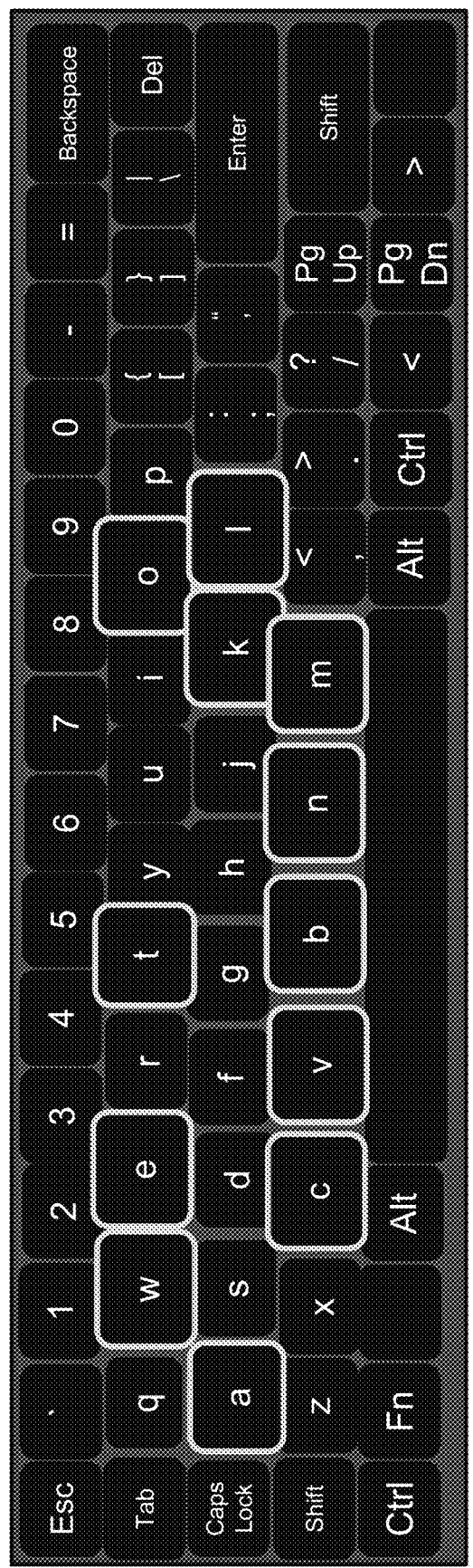
FIG. 6 depicts an example of both enlarging and reducing the sizes of given keys on a virtual keyboard, according to an illustrative embodiment.

FIG. 6 depicts an example of both enlarging and reducing the sizes of given keys on a virtual keyboard 600, according to an illustrative embodiment. As shown, in this illustrative embodiment, customizer 110 using the methodologies described above enlarges and displays the keys labeled "w", "e", "t", "o", "a", "k", "l", "c", "v", "b", "n" and "m". Furthermore, customizer 110 using the methodologies described above reduces and displays the keys labeled "Tab", "CapsLock" and "Shift".

Figure 7:
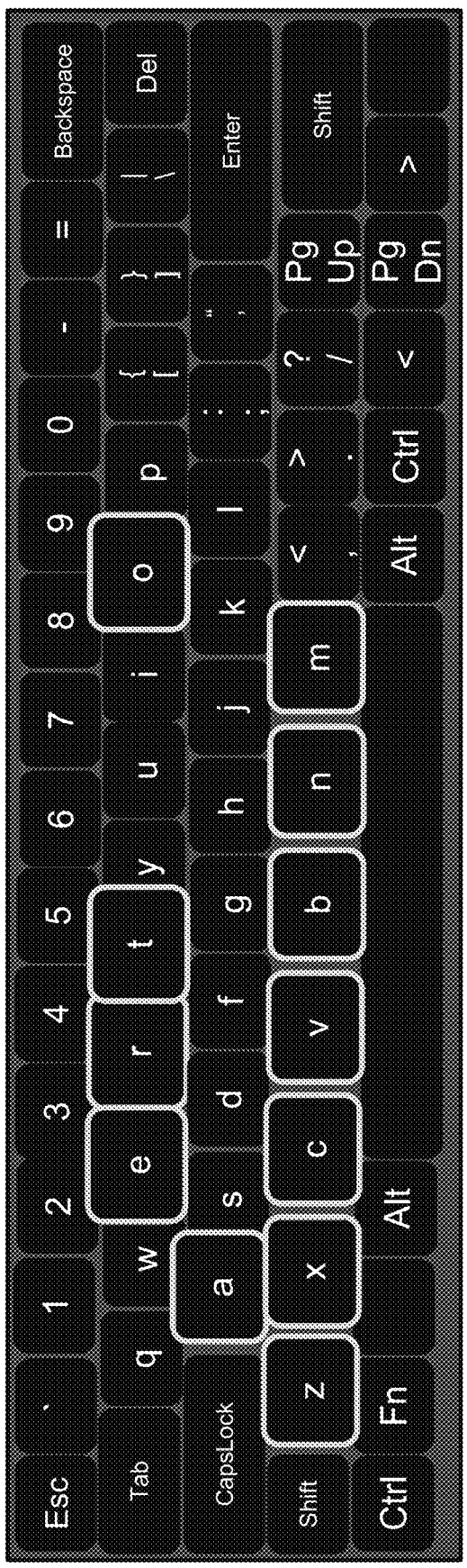
FIG. 7 depicts another example of both enlarging and reducing the sizes of given keys on a virtual keyboard, according to an illustrative embodiment.

Note also that the "Shift" key is a redundant key on a standard virtual keyboard, i.e., there is a left-side "Shift" key and a right-side "Shift" key. Customizer 110 is also configured to track which one of this pair of redundant keys is being used more frequently by the user, and then identify that key as a candidate to be reduced. FIG. 7 depicts another example of both enlarging and reducing the sizes of given keys on a virtual keyboard 700, according to an illustrative embodiment.

FIG. 8 depicts a processing platform 800 used to implement a user interface component customizer, according to an illustrative embodiment. More particularly, processing platform 800 is a processing platform on which a computing environment with functionalities described herein (e.g., FIGS. 1-7 and otherwise described herein) can be implemented.

The processing platform 800 in this embodiment comprises a plurality of processing devices, denoted 802-1, 802-2, 802-3, . . . 802-N, which communicate with one another over network(s) 804. It is to be appreciated that the methodologies described herein may be executed in one such processing device 802, or executed in a distributed manner across two or more such processing devices 802. It is to be further appreciated that a server, a client device, a computing device or any other processing platform element may be viewed as an example of what is more generally referred to herein as a "processing device." As illustrated in FIG. 8, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 802 shown in FIG. 8. The network(s) 804 represent one or more communications networks that enable components to communicate and to transfer data therebetween, as well as to perform other functionalities described herein.

The processing device 802-1 in the processing platform 800 comprises a processor 810 coupled to a memory 812. The processor 810 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 810. Memory 812 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 812 may comprise electronic memory such as random-access memory (RAM), read-only memory (ROM) or other types of memory, in any combination. The one or more software programs when executed by a processing device such as the processing device 802-1 causes the device to perform functions associated with one or more of the components/steps of system/methodologies in FIGS. 1-7. One skilled in the art would be readily able to implement such software given the teachings provided herein. Other examples of processor-readable storage media embodying embodiments of the invention may include, for example, optical or magnetic disks.

Processing device 802-1 also includes network interface circuitry 814, which is used to interface the device with the networks 804 and other system components. Such circuitry may comprise conventional transceivers of a type well known in the art.

The other processing devices 802 (802-2, 802-3, . . . 802-N) of the processing platform 800 are assumed to be configured in a manner similar to that shown for computing device 802-1 in the figure.

The processing platform 800 shown in FIG. 8 may comprise additional known components such as batch processing systems, parallel processing systems, physical machines, virtual machines, virtual switches, storage volumes, etc. Again, the particular processing platform shown in this figure is presented by way of example only, and the system shown as 800 in FIG. 8 may include additional or alternative processing platforms, as well as numerous distinct processing platforms in any combination.

Also, numerous other arrangements of servers, clients, computers, storage devices or other components are possible in processing platform 800. Such components can communicate with other elements of the processing platform 800 over any type of network, such as a wide area network (WAN), a local area network (LAN), a satellite network, a telephone or cable network, or various portions or combinations of these and other types of networks.

Furthermore, it is to be appreciated that the processing platform 800 of FIG. 8 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 800 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-8 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   presenting a user interface to a user;
   determining whether or not to customize a size of one or more components on the user interface;
   determining candidate components on the user interface to customize, when a determination is made to customize a size of one or more components on the user interface;
   customizing the candidate components on the user interface; and
   presenting a customized user interface including the candidate components to the user;
   wherein determining the candidate components is based in part on historical frequency of use of the candidate components;
   wherein customizing the candidate components of the user interface comprises at least one of enlarging and reducing a size of the candidate components;
   wherein determining whether or not to customize a size of one or more components on the user interface further comprises:
      determining a derived radius for a contact area calculated in accordance with the user directly touching the one or more components of the user interface;
      determining an average radius for a contact area associated with the one or more components of the user interface; and
      comparing the derived radius against the average radius; and
   wherein the presenting, determining, and customizing steps are executed by a processing device operatively coupled to a memory.

2. The method of claim 1, wherein a determination to customize a size of one or more components on the user interface is made when the derived radius is greater than the average radius.

3. The method of claim 1, wherein determining the candidate components on the user interface to customize further comprises determining a first set of one or more components of the user interface that are frequently used.

4. The method of claim 3, wherein determining the candidate components on the user interface to customize further comprises determining a second set of one or more components of the user interface that represent one or more component combinations which are part of a recommendation made for a subsequent selection by the user.

5. The method of claim 4, wherein the candidate components to be customized comprise the components that represent an intersection of the first set and the second set.

6. The method of claim 1, wherein customizing candidate components of the user interface comprises enlarging and reducing sizes of at least some of the candidate components.

7. The method of claim 1, wherein the user interface comprises a virtual keypad and the one or more components of the virtual keypad comprise one or more keys.

8. The method of claim 1, further comprising:
   tracking which one of redundant components on the user interface are being used by the user; and
   identifying at least one of the redundant components as a candidate component to be customized.

9. The method of claim 7, wherein one candidate component reduced in size is a redundant key on the virtual keyboard.

10. The method of claim 1, wherein the average radius of the one or more components is based at least in part on dimensions of the one or more components.

11. The method of claim 1, wherein a change in the size of the one or more components is directly proportional to a difference in the derived radius compared to the average radius.

12. An apparatus comprising:
   a processing device operatively coupled to a memory and configured to:
   present a user interface to a user;
   determine whether or not to customize a size of one or more components on the user interface;
   determine candidate components on the user interface to customize, when a determination is made to customize a size of one or more components on the user interface;
   customize the candidate components on the user interface; and
   present a customized user interface including the candidate components to the user;
   wherein determining the candidate components is based in part on historical frequency of use of the candidate components; and
   wherein customizing the candidate components of the user interface comprises at least one of enlarging and reducing a size of the candidate components;
   wherein determining whether or not to customize a size of one or more components on the user interface further comprises:
      determining a derived radius for a contact area calculated in accordance with the user directly touching one or more components of the user interface;
      determining an average radius for a contact area associated with the one or more components of the user interface; and
      comparing the derived radius against the average radius.

13. The apparatus of claim 12, wherein a determination to customize a size of one or more components on the user interface is made when the derived radius is greater than the average radius.

14. The apparatus of claim 12, wherein determining the candidate components on the user interface to customize further comprises determining a first set of one or more components of the user interface that are frequently used.

15. The apparatus of claim 14, wherein determining the candidate components on the user interface to customize further comprises determining a second set of one or more components of the user interface that represent one or more component combinations which are part of a recommendation made for a subsequent selection by the user, and wherein the candidate components to be customized comprise the components that represent an intersection of the first set and the second set.

16. The apparatus of claim 12, wherein the processing device is further configured to:
   track which one of redundant components on the user interface are being used by the user; and
   identify at least one of the redundant components as a candidate component to be customized.

17. The apparatus of claim 12, wherein a change in the size of the one or more components is directly proportional to a difference in the derived radius compared to the average radius.

18. An article of manufacture comprising a non-transitory processor-readable storage medium having stored therein program code of one or more software programs, wherein the program code when executed by at least one processing device causes said at least one processing device to perform steps of:
   presenting a user interface to a user;
   determining whether or not to customize a size of one or more components on the user interface;
   determining candidate components on the user interface to customize, when a determination is made to customize a size of one or more components on the user interface;
   customizing the candidate components on the user interface; and
   presenting a customized user interface including the candidate components to the user;
   wherein determining the candidate components is based in part on historical frequency of use of the candidate components;
   wherein customizing the candidate components of the user interface comprises at least one of enlarging and reducing a size of the candidate components;
   wherein determining whether or not to customize a size of one or more components on the user interface further comprises:
      determining a derived radius for a contact area calculated in accordance with the user directly touching one or more components of the user interface;
      determining an average radius for a contact area associated with the one or more components of the user interface; and
      comparing the derived radius against the average radius.

19. The article of manufacture of claim 18, wherein a change in the size of the one or more components is directly proportional to a difference in the derived radius compared to the average radius.

20. The article of manufacture of claim 18, wherein a determination to customize a size of one or more components on the user interface is made when the derived radius is greater than the average radius.

* * * * *